United States Patent
Malkin

(10) Patent No.: US 7,785,516 B2
(45) Date of Patent: Aug. 31, 2010

(54) METHOD OF MANUFACTURING A FILTRATION DEVICE

(76) Inventor: Edward Malkin, 52 Kennedy Ave., Rockville Centre, NY (US) 11570

(*) Notice: Subject to any disclaimer, the term of this patent is extended or adjusted under 35 U.S.C. 154(b) by 963 days.

(21) Appl. No.: 10/437,078

(22) Filed: May 14, 2003

(65) Prior Publication Data

US 2003/0201222 A1 Oct. 30, 2003

Related U.S. Application Data

(63) Continuation of application No. 09/779,882, filed on Feb. 9, 2001, now abandoned.

(51) Int. Cl.
  *B29C 45/14* (2006.01)
(52) U.S. Cl. ......... 264/271.1; 264/328.1; 264/DIG. 48; 210/497.01
(58) Field of Classification Search ........... 210/454, 210/455, 485, 486, 490, 497.01, 497.2, 499, 210/507; 156/218, 272.8, 308.4; 264/266, 264/271.1, 328.1, 400, DIG. 48
See application file for complete search history.

(56) References Cited

U.S. PATENT DOCUMENTS

| | | | |
|---|---|---|---|
| 1,116,234 A | 11/1914 | Brown | |
| 1,677,118 A | 7/1928 | Ford | |
| 1,693,741 A | 12/1928 | Wuest | |
| 2,035,758 A | 3/1936 | Pierce | |
| 2,979,209 A | 4/1961 | Nolden | |
| 3,319,796 A | 5/1967 | Royer et al. | |
| 3,400,821 A | 9/1968 | Singleton | |
| 3,501,013 A | 3/1970 | Madsen | |
| 3,701,433 A | 10/1972 | Krakauer et al. | |
| 3,750,889 A | 8/1973 | Acosta | |
| 4,098,695 A | 7/1978 | Novotny | |
| 4,130,622 A * | 12/1978 | Pawlak | ............ 264/255 |
| 4,204,966 A | 5/1980 | Morgan, Jr. | |
| 4,420,396 A | 12/1983 | Yamamoto et al. | |
| 4,860,805 A | 8/1989 | Townsend | |
| 5,162,106 A | 11/1992 | Kunda et al. | |
| 5,441,637 A | 8/1995 | Gutjahr et al. | |
| 5,587,071 A | 12/1996 | Belden | |
| 5,699,683 A * | 12/1997 | Rieker | ............ 68/198 |
| 6,099,729 A * | 8/2000 | Cella et al. | ............ 210/315 |
| 6,105,787 A | 8/2000 | Malkin | |
| 6,517,659 B1 * | 2/2003 | VanderWerf et al. | ........ 156/251 |

FOREIGN PATENT DOCUMENTS

| | | |
|---|---|---|
| JP | 55-111513 | 8/1980 |
| JP | 59-27806 | 2/1984 |
| JP | 2-119909 | 5/1990 |

(Continued)

*Primary Examiner*—Matthew O Savage
(74) *Attorney, Agent, or Firm*—Buchanan Ingersoll & Rooney PC

(57) ABSTRACT

A filtration device and a method of manufacturing the same, the filter device including a tubular body having a body wall defining a rigid support structure with a plurality of inlet openings, the body wall further having an inside wall structure and an outside wall structure, a central bore extending through the tubular body and being coextensive with the body wall, and an end portion on each opposing end of the body wall. The filtration device further includes a filtering medium disposed between the inside wall structure and the outside wall structure of the body wall, thereby filling the plurality of inlet openings.

1 Claim, 4 Drawing Sheets

FOREIGN PATENT DOCUMENTS

| | | |
|---|---|---|
| JP | 3-19511 | 2/1991 |
| JP | 3-270702 | 12/1991 |
| JP | 4-14107 | 2/1992 |
| JP | 6-41809 | 6/1994 |
| JP | 7-136413 | 5/1995 |
| JP | 3032594 | 12/1996 |

* cited by examiner

METHOD OF MANUFACTURING A FILTRATION DEVICE

RELATED APPLICATIONS

This application is a continuation of U.S. patent application Ser. No. 09/779,882 filed on Feb. 9, 2001, now abandoned.

FIELD OF THE INVENTION

The present invention relates to a filter for liquids. More particularly, the present invention is a filtration device for removing particulate matter, debris and other items found as contaminants in solutions used in photographic processing equipment.

BACKGROUND OF THE INVENTION

In recent years, businesses offering rapid processing and printing of color print film, the "One Hour Photo" services, have proliferated. The commercial availability of the automated machines used for this rapid processing and printing, and their comparatively low cost have enabled many small business owners to enter the field, so that the photo finishing business is no longer confined to a few major commercial photo laboratories.

The processing equipment uses a variety of chemicals for film processing and printing. Each chemical is kept in a separate tank or reservoir from which it is pumped into the processing area of the machine at an appropriate time. The chemicals are preferably pumped through the machine in a continuous loop. The manufacturers supply directions as to the working life of each chemical agent, and directions as how to replenish the chemicals after a specified usage. In the course of processing and storage of the chemicals, various types of particulate matter, debris such as film fragments or paper fragments, aggregates of photographic chemicals, dirt, dust, or microorganisms such as algae or bacteria may contaminate the chemicals and their storage tanks. The presence of contaminants can damage film or prints being processed by scratching negatives or prints, causing losses that may require reprocessing or retouching, assuming such damage can be remedied. Contaminants may decrease the efficacy of the chemicals themselves, or clog up the processing equipment, resulting in lost time spent to clean the equipment.

Although disposable filters are available, their replacement cost over time can be significant. The cumulative disposal of filters also has a negative environmental impact. Conventional filters utilized in this equipment are also difficult to reuse because the filtration material is mounted on the inside of the filter. Consequently, these filters are difficult to thoroughly clean. Some of the materials used to manufacture these filters are subject to being washed off or damaged when subjected to cleaning, thus preventing their reuse.

One commercially available product employs a stainless steel filter tube that is fitted over a frame manufactured from an extruded plastic material. Although this filter fits on the frame like a sleeve, it is difficult to clean and maneuver into a good (i.e., fluid-tight) fit within the apparatus.

A further reusable filter is described in U.S. Pat. No. 6,105,787, to the present inventor, the entire contents of which is hereby incorporated by reference. The '787 patent describes a filtration device having a rigid tubular body that terminates in a pair of open ends. The body has a plurality of openings therein, leading to a bore, and a layer of a filtration material is stretched over the surface of the body. The filtration material is attached near the ends of the body, and a pair of end caps are glued within the ends. Although the filter described in the '787 patent has been successful, problems have arisen in maintaining consistency during production. More specifically, the filter is hand manufactured and thus each filter is slightly different in size, tightness of the filtration material, and the reliability of the glue attachment is compromised.

Thus, there is a need for a filtration device having a filter that is made of a filtration material that is reusable, that will not be washed off of its support matrix during cleaning, that will not be damaged from abrasion or cleansing agents during cleaning, and that can be economically manufactured with a high degree of quality control. Further, the filtration device should be made of materials capable of withstanding the physical conditions, including pressures, temperatures and flow rates, and chemical conditions of the environment of photographic processing chemicals in automated processing machines.

BRIEF SUMMARY OF THE INVENTION

The present invention overcomes the disadvantages of the prior art by providing a reusable filtration device for removing particulate matter from a liquid in a liquids processing system. The filtration device includes a tubular body having a body wall defining a rigid support structure with a plurality of inlet openings, the body wall further comprising an inside wall structure and an outside wall structure, a central bore extending through the tubular body and being coextensive with the body wall, and an end portion on each opposing end of the body wall. The filtration device further includes a filtering medium disposed between the inside wall structure and the outside wall structure of the body wall, thereby filling the plurality of inlet openings.

A further aspect of the present invention provides a method of manufacturing a reusable filtration device for removing particulate matter from a liquid in a liquids processing system. The method includes forming a tubular sleeve from a filtration material, disposing the tubular sleeve about a mold core, placing the mold core within a mold cavity, and injection molding the filtration device within the mold cavity to form the filtration device comprising a tubular body having a body wall defining a rigid support structure having a plurality of inlet openings, the body wall further comprising an inside wall structure and an outside wall structure; a central bore extending through the tubular body and being coextensive with the body wall; the body wall terminating in a pair of end portions; and the tubular sleeve of filtration material being disposed between the inside wall structure and the outside wall structure of the body wall, thereby filling the plurality of inlet openings. In a further aspect of the present invention, the injection molding step includes forming the outside wall structure as a plurality of transverse and longitudinal struts so as to define the plurality of inlet openings therebetween and still further, the injection molding step includes forming the inside wall structure as a plurality of longitudinally extending ribs, the ribs being axially aligned with the longitudinal struts such that the filtration material is sealed therebetween during said molding step.

BRIEF DESCRIPTION OF THE DRAWING FIGURES

These, and other, objects, features and advantages of the present invention will become more readily apparent to those skilled in the art upon reading the following detailed description, in conjunction with the appended drawings, in which.

DETAILED DESCRIPTION OF THE PRESENT INVENTION

The terms "reagent", "fluid", "chemistry", "chemical", or "solution" are being used interchangeably when referring to the fluids being filtered by the filtration device of the present invention.

The present invention is directed to a filtration device 10 that is designed for use in conjunction with various types of commercial equipment for photographic film and paper processing operations, such as, but not meant to be limited to, those typically used by "One Hour Photo" service businesses.

Figure 1:
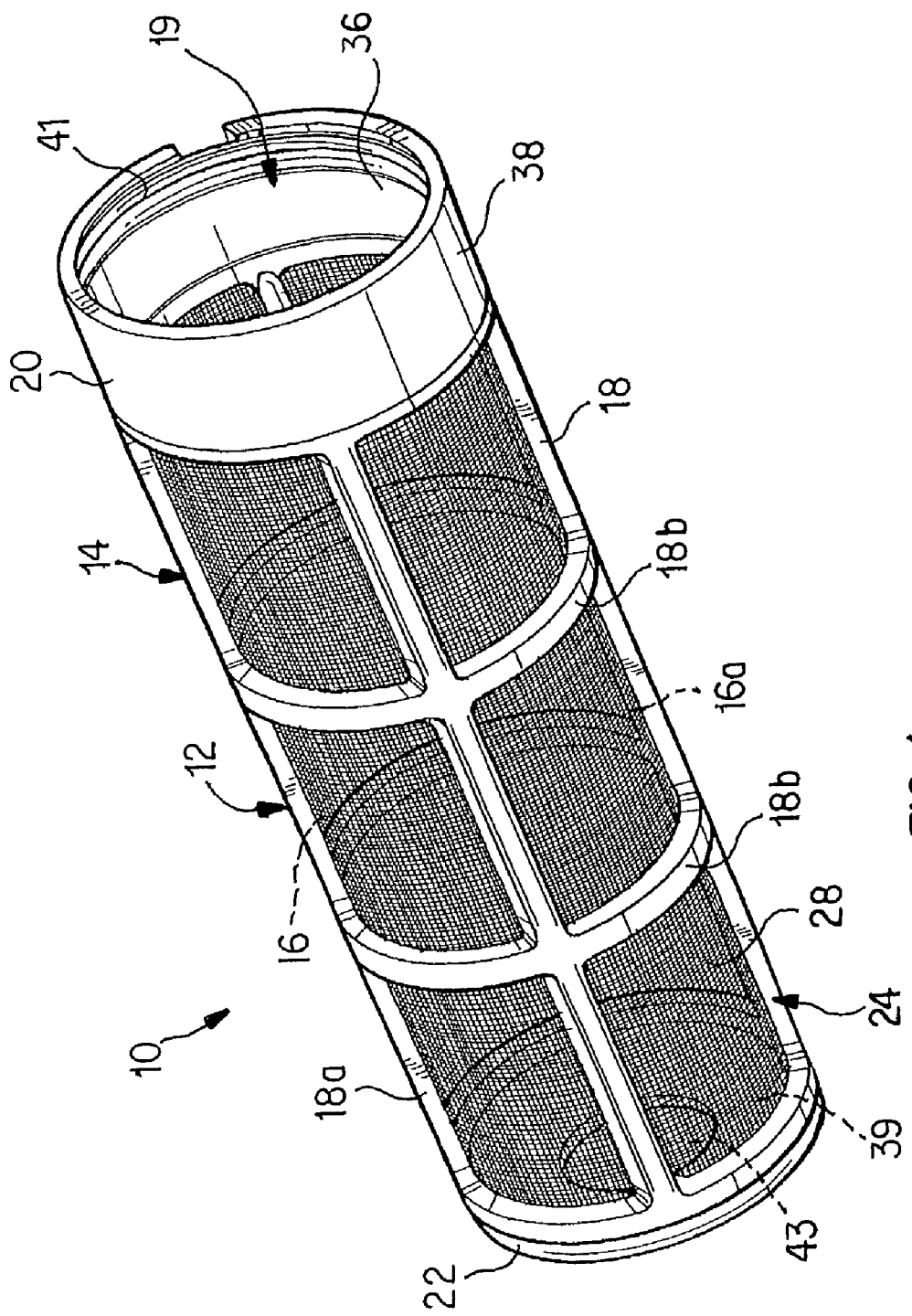
FIG. 1 is a side perspective view of a filtration device according to the present invention.
Figure 2:
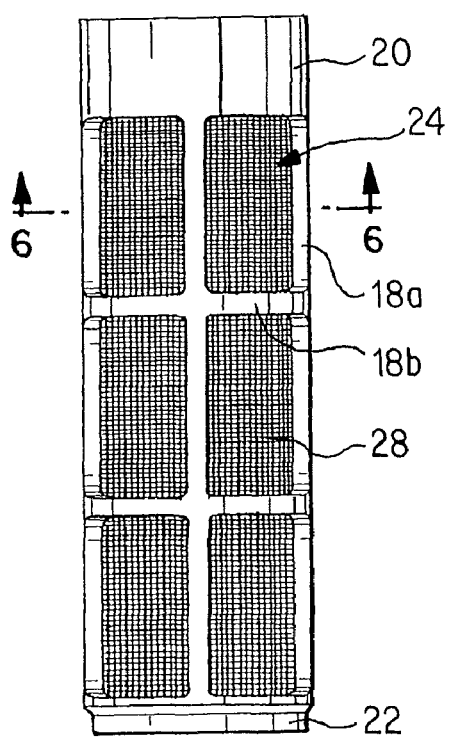
FIG. 2 is a side elevational view of the filtration device shown in FIG. 1.
Figure 5:
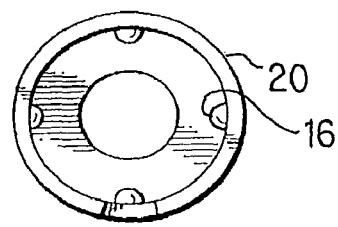
FIG. 5 is a bottom view of the filtration device of the present invention.
Figure 6:
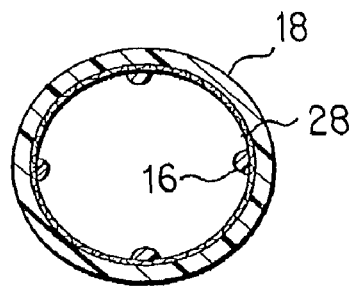
FIG. 6 is a cross-section through the filtration device as taken along line 6-6 in FIG. 2.

Referring to FIG. 1, the filtration device 10 has a hollow, rigid tubular body 12. The body 12 has a cylindrical wall structure 14 including an inside wall structure 16 and an outside wall structure 18. The tubular body 12 is preferably formed from a plastic such as polypropylene, as will be described in greater detail below, although other materials could be used as well. The outside wall structure 18 includes a plurality of openings 24 within the body wall. In the preferred embodiment, openings 24 are arranged in a symmetrical pattern of twelve windows as illustrated, but other configurations and orientations of openings can of course also be utilized as desired to optimize fluid flow therethrough without reducing the structural integrity of the body 12. The openings 24 or windows are generally large rectangular areas defined by longitudinal and transverse struts 18a, 18b. The inside wall structure 16 is formed by a plurality of longitudinally extending ribs 16a, as best shown in FIGS. 5 and 6. A central bore 19 is coextensive with the inside of the length of body 12. The wall structure 14 terminates at a pair of end portions 20 and 22. Together, the inside wall structure 16 and outside wall structure 18 form a central support structure that prevents the collapse of the filtration device under the pressures commonly used to pump the chemicals used in these processing operations.

A layer of filtration material 28 is disposed between the outside wall structure 18 and the inside wall structure 16, thus filling the openings 24 and extending to the end portions 20 and 22. Body 12 is open at both ends so as to allow fluid flow into and out of the central bore 19 of the device. In the preferred embodiment of the present invention, the filtration material 28 is a mesh material, and more preferably it is a polypropylene mesh, which is insert molded during formation of the device 10, as described in further detail below. The mesh selected for the preferred embodiment has a pore size between approximately 30 microns and approximately 150 microns, and most preferably approximately 105 microns. A seam 30 is coextensive with the length of the filtration material, as will be described in detail below.

Figure 3:
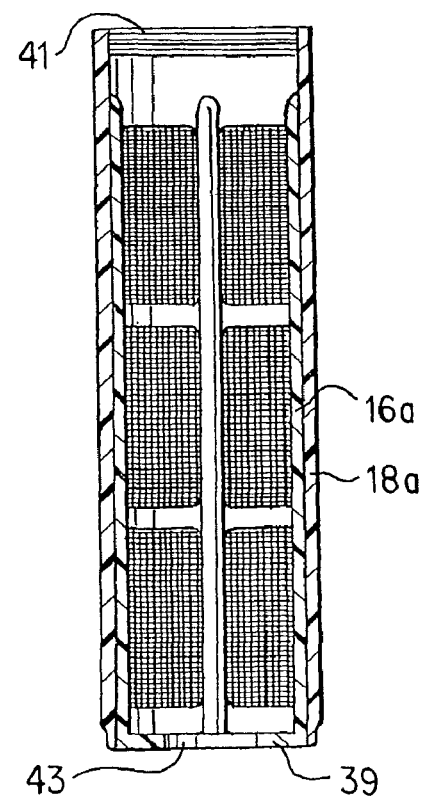
FIG. 3 is a longitudinal cross-sectional view taken through the middle of the filtration device of FIG. 1.
Figure 4:
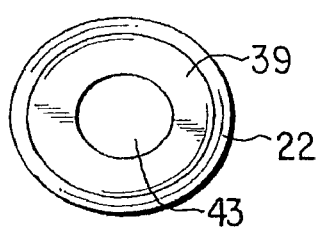
FIG. 4 is a top view of the filtration device of the present invention.
Figure 7:
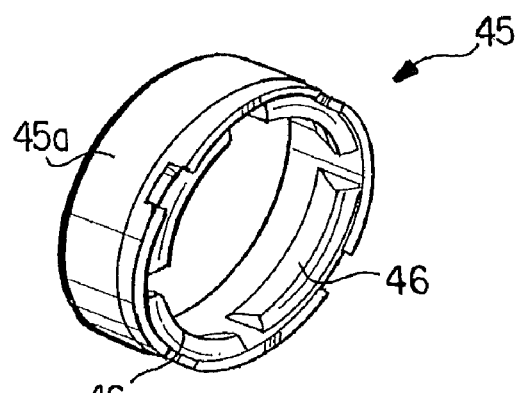
FIG. 7 is a perspective view of one embodiment of an end portion adapter for use with the filtration device shown in FIG. 1.
Figure 8:
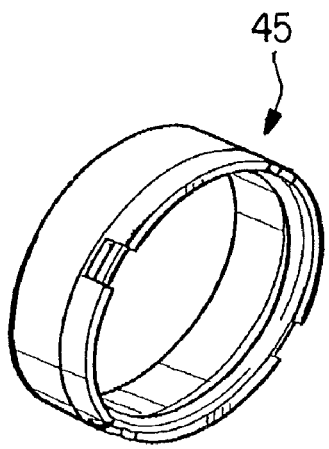
FIG. 8 is a perspective view of another embodiment of an end portion adapter.
Figure 9:
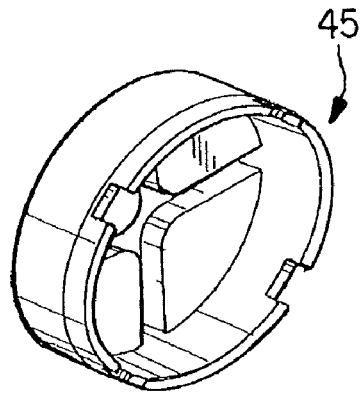
FIG. 9 is a perspective view of yet another embodiment of an end portion adapter.

Each end of tubular body 12 is integrally formed with the end portions 20, 22. End portion 20 has an inside surface 36 and an outside surface 38. The inside surface 36 may further include an annular groove 41, as best shown in FIGS. 1 and 3. End portion 20 also preferably includes an end portion adapter 45, a variety of which are shown in FIGS. 7-9. With the adapter 45, end portion 20 fits onto a filter holder in the filter housing of the apparatus. In a further embodiment of the invention, the outside surface 38 of the end portion 20 may be provided with an annular groove for receiving an O-ring. Thus, end portion 20 with the O-ring therearound, fits into a filter holder in the filter housing of the apparatus. As should be apparent to one skilled in the art, the illustrated adapters and the described O-ring configuration are merely examples of possible coupling connections and any type of connection mechanism could be used for attaching the filtration device 10 of the present invention to a filter holder in a photographic processing apparatus. End portion 22 preferably has a coupling mechanism including an end plate 39 with an opening 43 which fits onto a mating receptacle on the filter housing of the apparatus, but other end portion coupling configurations could also be used such as an outer O-ring, for example.

Referring to FIG. 7, adapter 45a is one of a plurality of adapter or coupling devices which can be used, depending upon the particular photographic processing apparatus into which filtration device 10 is going to be installed. Adapter 45a preferably includes a plurality of wedge-shaped elements 46 disposed about the interior perimeter of the adapter. With adapter 45a fitted or molded into the end portion 20 of the filtration device 10, attachment to the filter holder is easily obtained. More particularly, the wedge-shaped elements 46 render the filtration device 10 self tightening as it is turned preferably one-quarter turn to be mounted on the filter holder. FIGS. 8 and 9 illustrate further configurations for adapters or coupling devices 45, each for use on a different photo processing apparatus. These coupling devices can similarly be fixed or molded with the end portion of the filter device 10.

The filtration device 10 of the present invention is formed in the following preferred manner. In the first instance, the filtration material 28 is disposed about a stainless steel mandrel. Preferably, the outer diameter of the mandrel will be substantially equal to the desired inner diameter of the finished filtration device. The material 28 is heat or sonic welded about the mandrel so as to form a tubular sleeve and with the longitudinal seam 30 thereon. The transverse ends of the material 28 are preferably laser cut so as to simultaneously seal the material and prevent the mesh from fraying. The filtration material sleeve is then removed from the mandrel. Following this procedure, filtration sleeves can be formed in a plurality of sizes for use in forming a plurality of different sizes of finished filtration devices. In the next phase of manufacture, a filtration sleeve is disposed about a mold core member, preferably one that is cylindrical in shape. The mold core member with the sleeve therearound is then placed in the mold cavity of a mold, and the filtration device 10 is injection molded with the filtration material 28 in place. The mold cavity is configured such that during the injection molding step the filtration material 28 of the sleeve is sealed between the molded longitudinal struts 18a of the outer wall structure 18 and the molded longitudinal ribs 16a of the inner wall structure 16. The upper and lower transverse ends of the filtration sleeve are similarly sealed to the molded end portions 20, 22. In a preferred embodiment, the desired end portion coupling devices are integrally molded simultaneously with the molding of the filter body 12. The finished device 10 can then be removed from the mold cavity. The integral injection molding of the filtration device 10 of the present invention overcomes many of the quality control problems associated with the individual hand manufacture and gluing operations used in the past. More particularly, filtration devices formed by the injection molding process of the present invention have a consistent and uniform size and configuration.

Figure 11:
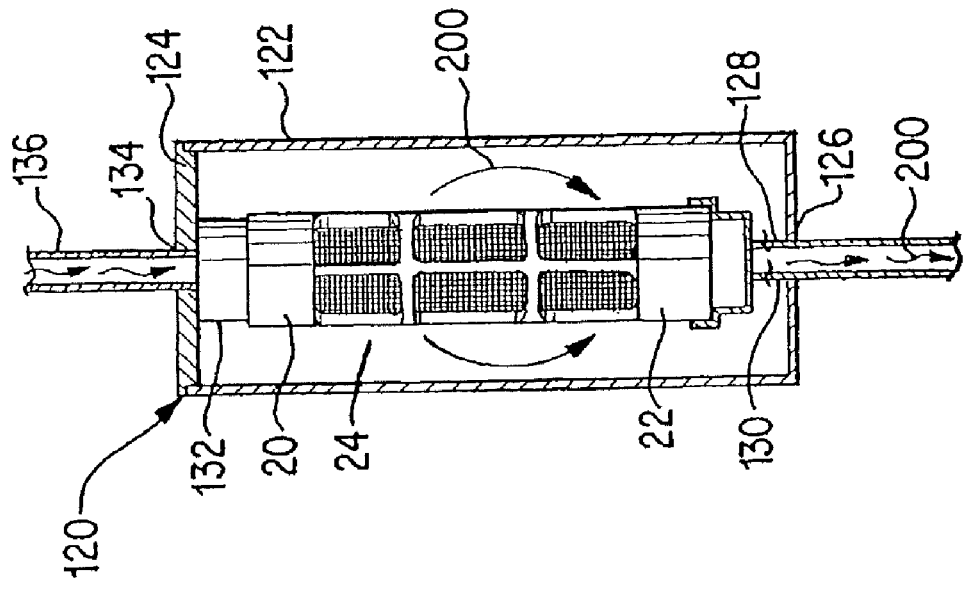
FIG. 11 is a sectional view taken along line 11-11 of FIG. 10 and showing the filtration device of the present invention in use in a photographic processing apparatus.
Figure 10:
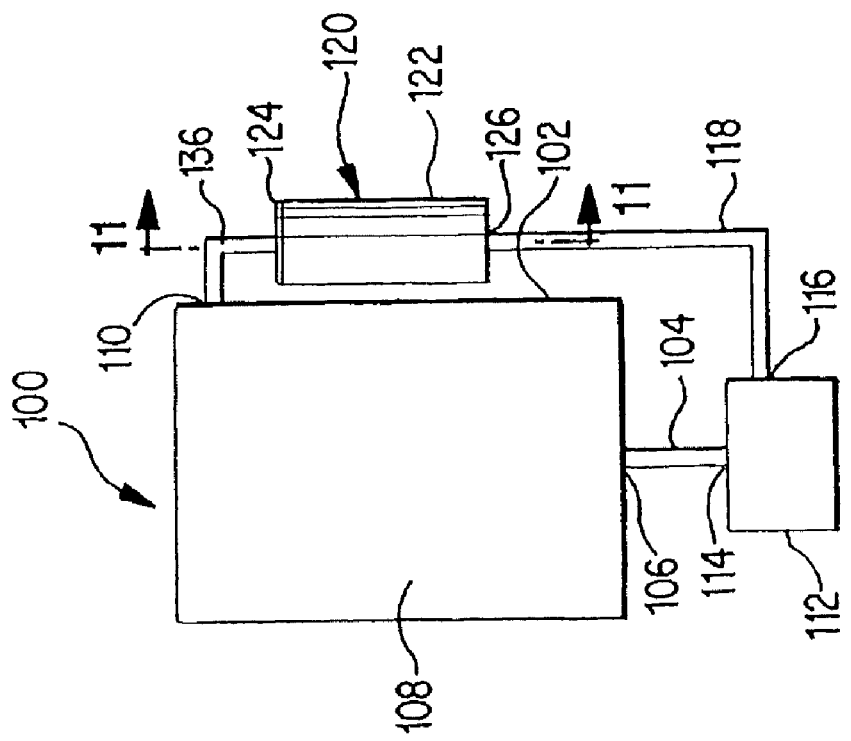
FIG. 10 is a schematic view showing how the filtration device of the present invention is used in a photographic processing apparatus.

When placed in a photo processing apparatus, the filtration device 10 of the present invention functions in the following manner. Referring to FIGS. 10 and 11, the filtration device 10 is designed so that the flow of fluid is from the outside of the filtration device, through the filtration material 28 within the openings 24, to the inside of the filtration device and out through one of the ends. (The direction of fluid flow is shown by arrows 200 in FIG. 11.) The end portions 20, 22 are connected in such a way as to allow fluids to enter and fill the filtration housing and surround the filtration device 10, as described further below.

Both end portions of filtration device 10 are preferably inserted into the filter housing 120 and, depending upon the particular processing apparatus in which the present invention is employed, one of the adapters 45 or another coupling connection may be attached to the end portion 20 to facilitate insertion of the filtration device 10 onto the particular filter holder. The filtration device can be inserted into a receptacle at the bottom of the filter housing, held in place by rubber 0-rings to effect a seal, or forced or pressed fit into position.

Filtration device 10 is capable of withstanding the pressures and flow rates of the various processing devices. The present invention can be used in both high speed and low speed processing equipment. As an example, and not meant to be a limitation, a flow rate of two to five gallons per minute is typical of the flow rates that the filtration device 10 must withstand.

Generally, a processing apparatus employs several chemicals, each of which is stored in their own tank or reservoir 100, as shown schematically in FIG. 10 (for a single tank). Thus, a single processing apparatus has multiple filters because a separate filtration device is used for each chemical, such as the developer, bleach, or fixer.

By way of example, the filtration device 10 of the present invention may be retained in a filter housing 120 that is attached to the outside portion 102 of a tank 100 containing photographic chemicals 108. The filter housing 120 can be molded onto the side of the tank as shown in FIG. 10, or it may be a separate unit that is attached to the tank outside by appropriate attachment means. Filter housing 120 has a body 122 and top portion 124 that is removably attached to body 122. Top portion 124 can be attached to body 122 by means known to those skilled in the art, such as, but not limited to, press fit, screwed on using threaded components, or retention by clamping means (not shown). It is important that the housing body 122 and the housing top 124 form a fluid-tight seal so as to prevent leakage of chemicals 108 during operation of the photo finishing apparatus.

Assuming a clockwise flow path in the exemplary embodiment of FIG. 10, fluid conduit means 104 connect an inlet 106 of tank 100 to a pump 112 at outlet 114 and at pump inlet 116 fluid conduit means 118 connect pump 112 to the filter housing outlet 126. The fluid being processed is pumped into the tank 100, exits through outlet 110 and then enters the filter housing inlet 134 through conduit means 136. Fluid 108 preferably fills the filter housing 120 and surrounds filtration device 10 from the outside, passing through the filtration material 28 within the plurality of openings 24 within filter body 12 (shown by arrows 200 in FIG. 11). Fluid 108 passes through to the inside of filtration device 10, and the now filtered fluid passes through the outlet 126 and reenters tank 100 by way of return conduit means 118 at pump inlet 116. Debris and particulate matter removed from the fluid is retained on the surface of the filtration material 28.

As shown in FIG. 11, filter end portion 20 including an adapter or other coupling connection fits a retaining means or filter holder 132 in fluid communication with inlet 134 such that fluid 108 passes through the filter holder 132 and surrounds filtration device 10. The filtration device 10 forms a fluid-tight seal with the filter housing 120. Filter end portion 22 is retained in a second retaining means 128 in a manner similar to end portion 20. End portion 22 is in fluid communication with housing outlet 126, through which the filtered fluid 108 passes, flows through return conduit means 118 and reenters pump 112 at inlet 116 for further circulation. The process is similar for each chemical in the processing operation, although individual flow rates may vary based on the specifications of the process itself.

Removing the top 124 when the processing device has been turned off serves multiple functions. It provides access to the filtration device 10, enabling one to inspect it for build up of particulate matter on its filter surface 28, examine the overall physical condition and whether there has been deterioration of any of its components or damage to the filter element and to change filters when necessary.

The filtration material employed in the present invention is capable of withstanding the strong alkali and strong acid conditions that are characteristic of photographic chemicals. Developer solutions generally are alkaline, while the bleaches and fixatives are generally acidic solutions. In the preferred embodiment, this is a polypropylene mesh.

Since the inside wall surface 16 of the present invention is preferably formed by a plurality of ribs 16a extending the length of the tubular body 12, generally longitudinal channels are formed on the interior of the filter device 10. Any particulate matter or other items retained on the interior surface of the filtration material can thus be washed off or easily scrubbed within these longitudinal channels, allowing the filtration device to be cleaned and reused.

A significant increase in the pressure of the line, or a decrease in the flow rate, or both, are indicative of the filtration device becoming clogged, and a sign that the filtration device must be removed from the unit and cleaned. As will be known to one skilled in the art, the orientation of the filtration device and its filter housing can be vertical, as shown in FIG. 11, or otherwise oriented. The filtration device of the present invention will operate provided there is sufficient pressure in the system to circulate the chemicals through the filter.

The components used in the filtration device are manufactured from materials that preferentially are both physically resistant and chemically resistant to the chemicals used in the processing solutions. The filtration devices can be changed periodically as part of a standard maintenance program, or when they show signs of wear.

While the present invention has been described with preferred embodiments, it is to be understood that variations and modifications may be resorted to as will be apparent to those skilled in the art. For example, while specific examples of the coupling devices in the end portions of the filtration device are illustrated, other mechanisms for attachment could also be used. Further, while it is preferred for such coupling devices to be integrally molded with the filtration device, it is also within the scope of the present invention to have such devices glued or otherwise fitted within the end portions of the molded filtration devices. Such variations and modifications are to be considered within the purview and the scope of the present invention.

The invention claimed is:

1. A method of manufacturing a reusable filtration device for removing particulate matter from a liquid in a photographic processing system, said method comprising:
   providing a tubular sleeve from a filtration material;
   disposing the tubular sleeve about a mold core;
   placing the mold core within a mold cavity; and
   injection molding the filtration device within the mold cavity in an injection molding process, thereby forming the filtration device comprising a tubular body having a body wall defining a rigid support structure having a plurality of inlet openings, the body wall further comprising an inside wall structure and an outside wall structure; a central bore extending through the tubular body and being coextensive with the body wall; the body wall terminating in a pair of opposing end portions, one of said end portions defining an attachment end portion adapted for attachment to a filtration device holder in the photographic processing system and said opposing end portion defining an outlet end portion including an outlet opening adapted for passage of filtered liquid exiting the central bore; and the tubular sleeve of filtration material being disposed between the inside wall structure and the outside wall structure of the body wall, thereby filling the plurality of inlet openings;
   wherein said injection molding includes forming the outside wall structure as a plurality of transverse and longitudinal struts so as to define the plurality of inlet openings therebetween;
   wherein said injection molding includes forming the inside wall structure as a plurality of longitudinally extending ribs, the ribs being axially aligned with the longitudinal struts such that the filtration material is sealed therebetween during said molding step; and
   wherein said injection molding step comprises a single step injection molding process.

* * * * *